United States Patent
Fushimi et al.

(10) Patent No.: US 10,914,380 B2
(45) Date of Patent: Feb. 9, 2021

(54) PISTON AND PISTON RING FOR INTERNAL COMBUSTION ENGINE

(71) Applicants: KABUSHIKI KAISHA RIKEN, Tokyo (JP); HONDA FOUNDRY CO., LTD., Kawagoe (JP)

(72) Inventors: Kazuyuki Fushimi, Utsunomiya (JP); Yoshitaka Watanabe, Kawagoe (JP); Kazuki Sato, Kashiwazaki (JP)

(73) Assignees: KABUSHIKI KAISHA RIKEN, Tokyo (JP); HONDA FOUNDRY CO., LTD., Kawagoe (JP)

( * ) Notice: Subject to any disclaimer, the term of this patent is extended or adjusted under 35 U.S.C. 154(b) by 0 days.

(21) Appl. No.: 16/498,704

(22) PCT Filed: Mar. 27, 2018

(86) PCT No.: PCT/JP2018/012550
§ 371 (c)(1),
(2) Date: Sep. 27, 2019

(87) PCT Pub. No.: WO2018/181383
PCT Pub. Date: Oct. 4, 2018

(65) Prior Publication Data
US 2020/0040995 A1    Feb. 6, 2020

(30) Foreign Application Priority Data
Mar. 30, 2017 (JP) ................ 2017-068841

(51) Int. Cl.
*F16J 9/20* (2006.01)
*F02F 5/00* (2006.01)
(Continued)

(52) U.S. Cl.
CPC .. *F16J 9/22* (2013.01); *F02F 3/00* (2013.01)

(58) Field of Classification Search
CPC ...... F16J 9/20; F16J 9/206; F16J 9/203; F16J 9/22; F16J 15/3272; F16J 9/00; F02F 5/00
See application file for complete search history.

(56) References Cited

U.S. PATENT DOCUMENTS

| | | | |
|---|---|---|---|
| 6,536,385 B1 * | 3/2003 | Takashima | F16J 9/20 123/730 |
| 2006/0006604 A1 * | 1/2006 | Abe | F16J 9/20 277/434 |

(Continued)

FOREIGN PATENT DOCUMENTS

| | | |
|---|---|---|
| CN | 103339421 A | 10/2013 |
| JP | S57123938 U | 8/1982 |

(Continued)

OTHER PUBLICATIONS

Jul. 3, 2018, International Search Report issued in the International Patent Application No. PCT/JP2018/012550.
(Continued)

*Primary Examiner* — Long T Tran
(74) *Attorney, Agent, or Firm* — Kenja IP Law PC

(57) ABSTRACT

A piston includes a piston body and a piston ring fitted into a ring groove. The piston ring has a top surface that includes: a convex portion formed between an inner edge position and a central position at which a radial direction thickness is ½, with the piston ring in a free state, and a planar portion or an inclined peripheral portion continuous with the convex portion on a radially outer side of the convex portion. In a predetermined status of the piston body and the piston ring, an angle between the top surface of the ring groove and the planar portion or the inclined peripheral portion is at least 18 arcminutes in a cross-section that is parallel to a central axis of the piston body and includes the central axis.

20 Claims, 11 Drawing Sheets

(51) Int. Cl.
*F16J 9/22* (2006.01)
*F02F 3/00* (2006.01)

(56) References Cited

U.S. PATENT DOCUMENTS

| 2007/0017459 A1* | 1/2007 | Fieldler | F16J 9/203 |
| | | | 123/48 A |
| 2007/0018410 A1* | 1/2007 | Fiedler | F16J 9/206 |
| | | | 277/478 |
| 2013/0043659 A1* | 2/2013 | Ito | F16J 9/26 |
| | | | 277/443 |
| 2017/0184198 A1* | 6/2017 | Kawase | F16J 9/206 |

FOREIGN PATENT DOCUMENTS

| JP | S5965959 U | 5/1984 |
| JP | H08121242 A | 5/1996 |
| JP | H11182679 A | 7/1999 |
| JP | 2000257714 A | 9/2000 |
| JP | 2001182831 A | 7/2001 |

OTHER PUBLICATIONS

May 18, 2020, Office Action issued by the China National Intellectual Property Administration in the corresponding Chinese Patent Application No. 201880022089.8.

Oct. 1, 2019, International Preliminary Report on Patentability issued in the International Patent Application No. PCT/JP2018/012550.

\* cited by examiner

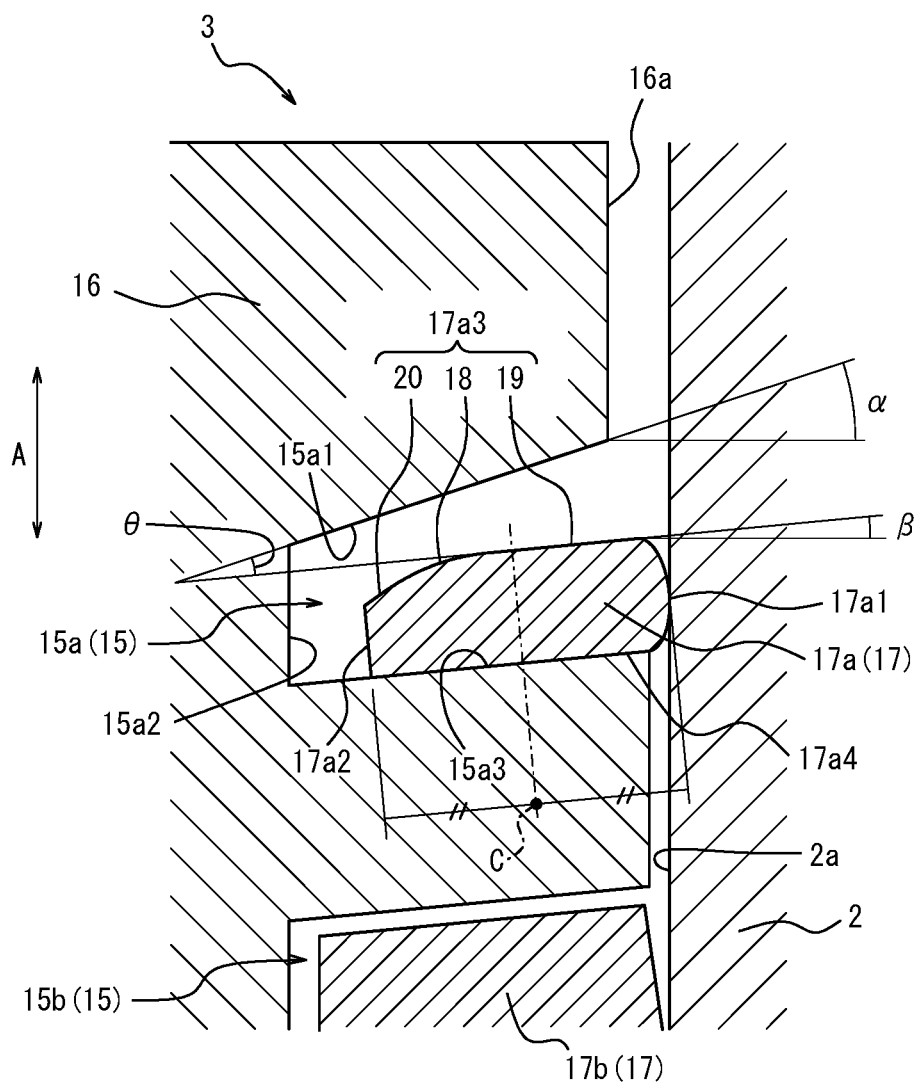

Piston moving direction

PISTON AND PISTON RING FOR INTERNAL COMBUSTION ENGINE

TECHNICAL FIELD

The present disclosure relates to a piston for an internal combustion engine and a piston ring.

BACKGROUND

Conventionally, internal combustion engines that include a piston and a cylinder for accommodating the piston in a slidable and reciprocable manner via a lubricating oil are known.

PTL 1 set forth below describes an internal combustion engine as described above, in which a gap between a piston body and a cylinder in a cool period decreases more on the piston crown side due to thermal expansion of the piston body in operation, and the posture of a first ring groove differs between the cool period and the operation period. In the internal combustion engine described in PTL 1, a first ring groove is formed, such that for each side surface of a first ring in free posture during operation, the cross-sectional shape of a gap between the ring surface and the ring groove has a wedge shape widened from an inner periphery of the ring to an outer periphery of the ring.

Also, PTL 2 set forth below describes a combined structure of a piston ring and a ring groove in a piston for an internal combustion engine in which one pressure ring and one oil ring are arranged. PTL 2 discloses a configuration in which a top surface of the ring groove having the pressure ring with an approximate rectangular cross-section fitted thereinto has an upward inclination of 10 to 50 arcminutes from inside to outside.

CITATION LIST

Patent Literature

PTL 1: JPH-A-08-121242
PTL 2: JP-A-2000-257714

SUMMARY

Technical Problem

During operation of an internal combustion engine, a piston reciprocates within a cylinder. Due to the influence of pressure and temperature, and the behavior of the piston and a piston ring, a top surface and a bottom surface of the piston ring come into contact with a top surface and a bottom surface of a ring groove, respectively, causing uneven abrasion of the top and bottom surfaces of the ring groove and the top and bottom surfaces of the piston ring. It is especially desirable to suppress uneven abrasion caused by contact between a first ring, which is also referred to as a top ring positioned uppermost among the piston rings, and a first ring groove having the first ring fitted therein.

Such uneven abrasion of the top and bottom surfaces of the ring groove and the top and bottom surfaces of the piston ring can be suppressed by treating the ring groove with an anodizing process or by providing a cooling channel or an abrasion resistant ring. However, such approaches increase manufacturing cost due to an increase in a manufacturing process, and also increases the weight of the piston. Thus, it is desirable to suppress uneven abrasion using a simple method.

As a result of intensive studies, the inventors have found that, although the configurations described in the PTL 1 and PTL 2 can suppress uneven abrasion of the top and bottom surfaces of the ring groove and the top and bottom surfaces of the piston ring to some extent, there is room for further improvement for satisfactorily suppressing uneven abrasion of the top surface of the ring groove and the top surface of the piton ring.

An object of the present disclosure is to provide a piston and a piston ring for an internal combustion engine that can suppress uneven abrasion of the top surface of the ring groove and the top surface of the piton ring.

Solution to Problem

A piston for an internal combustion engine according to a first embodiment of the present disclosure is capable of reciprocating within a cylinder of the internal combustion engine and includes a piston body having a peripheral surface on which a ring groove is formed and a piston ring fitted into the ring groove. A top surface of the piston ring includes a convex portion and at least one of a planar portion and an inclined peripheral portion. The convex portion is formed between an inner edge position and a central position at which a radial direction thickness is ½, with the piston ring in a free state, and extends so as to approach a bottom surface of the piston ring with convergence in a radially inward direction. The planar portion is continuous with the convex portion on a radially outer side of the convex portion. The inclined peripheral portion is continuous with the convex portion on a radially outer side of the convex portion and inclined so as to approach the bottom surface of the piston ring with convergence in the radially inward direction. In a predetermined status in which the piston body and the piston ring are incorporated in the cylinder and the internal combustion engine is in a cool state, an angle between a top surface of the ring groove and the planar portion or the inclined peripheral portion is at least 18 arcminutes in a cross-section that is parallel to a central axis of the piston body and includes the central axis.

According to the embodiment of the present disclosure, a radius of curvature of the convex portion in the cross-section is preferably at least 0.5 mm.

According to the embodiment of the present disclosure, the piston ring includes an opposite-split portion located opposite a split portion. Preferably, the angle between the top surface of the ring groove and the planar portion or the inclined peripheral portion an angle at a position of the opposite-split portion.

According to the embodiment of the present disclosure, in the predetermined status, an angle between the top surface of the ring groove and a plane orthogonal to the central axis in the predetermined status is preferably within a range of 30 to 180 arcminutes.

According to the embodiment of the present disclosure, in the predetermined status, an angle between the planar portion or the inclined peripheral portion and a plane orthogonal to the central axis in the predetermined status is preferably 0 arcminutes or more.

According to the embodiment of the present disclosure, preferably, when the inclined peripheral portion is defined as a first inclined peripheral portion, the top surface of the piston ring includes a second inclined peripheral portion that is continuous with the convex portion on a radially inner side of the convex portion and, compared with the planar portion and the first inclined peripheral portion, is inclined so as to approach the bottom surface of the piston ring with convergence in the radially inward direction.

According to the embodiment of the present disclosure, preferably, the convex portion of the piston ring is formed by a curved surface or a multi-step convex surface composed of a plurality of straight lines in a ring cross-section orthogonal to a circumferential direction of the piston ring.

According to the embodiment of the present disclosure, preferably, a plurality of ring grooves are formed on an outer peripheral surface of the piston body, and the piston ring is fitted into a first ring groove located uppermost in a central axis direction of the piston body among the plurality of ring grooves.

A piston ring according to a second embodiment of the present disclosure is a piston ring that is fitted into a ring groove formed on an outer peripheral surface of a piston body and includes a top surface composed of a convex portion and at least one of a planar portion and an inclined peripheral portion. The convex portion is formed between an inner edge position and a central position at which a radial direction thickness is ½, with the piston ring in a free state, and extends so as to approach a bottom surface of the piston ring with convergence in a radially inward direction. The planar portion is continuous with the convex portion on a radially outer side of the convex portion. The inclined peripheral portion is continuous with the convex portion on a radially outer side of the convex portion and inclined so as to approach the bottom surface of the piston ring with convergence in the radially inward direction.

According to the embodiment of the present disclosure, a radius of curvature of the convex portion in a ring cross-section is preferably 0.5 mm or more.

Advantageous Effect

According to the present embodiment, a piston and a piston ring for an internal combustion engine that are capable of suppressing uneven abrasion of the top surface of the ring groove and the top surface of the piston ring can be provided.

BRIEF DESCRIPTION OF THE DRAWINGS

FIG. 5 is an enlarged cross-sectional diagram illustrating a portion that includes the first ring and the first ring groove, extracted from the cross-sectional diagram illustrated in FIG. 2;

DETAILED DESCRIPTION

Figure 1:
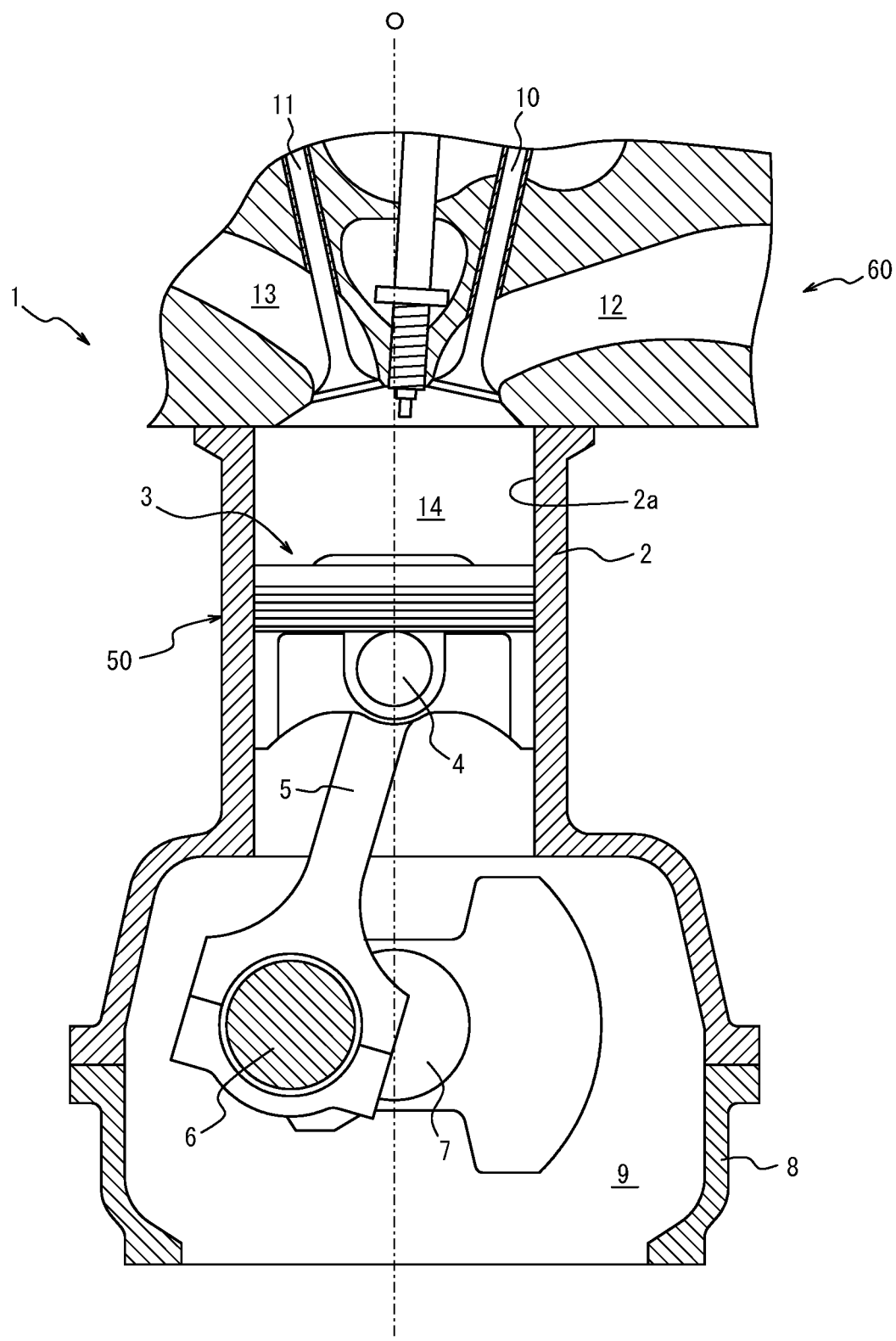
FIG. 1 is a diagram illustrating an internal combustion engine that includes a piston for an internal combustion engine according to an embodiment of the present disclosure.

Hereinafter, a piston and a piston ring for an internal combustion engine according to embodiments of the present disclosure will be described with reference to FIG. 1 to FIG. 13. Constituent elements and portions common to each of the figures are denoted by the same reference numerals.

FIG. 1 is a diagram illustrating a reciprocating engine (a reciprocating internal combustion engine) configured as an internal combustion engine 1. As illustrated in FIG. 1, the internal combustion engine 1 includes a cylinder 2 that has a cylindrical shape and is formed in a cylinder block 50, a piston 3 for the internal combustion engine according to an embodiment of the present disclosure which can slide on an inner wall 2a of the cylinder 2 within the cylinder 2 (hereinafter, referred to simply as "piston 3"), a connecting rod 5 having an upper end portion coupled to the piston 3 by a piston pin 4, and a crankshaft 7 coupled to a lower end portion of the connecting rod 5 by a crank pin 6. Although FIG. 1 illustrates the reciprocating engine serving as an internal combustion engine 1 configured as a gasoline engine in which the piston 3 can reciprocate in the vertical direction within the cylinder 2, the reciprocating engine may be of other types of internal combustion engine in which the piston reciprocates, such as a diesel engine.

A crankcase 8 is coupled to a lower portion of the cylinder block 50. Thus, the crankcase 8 and the lower portion of the cylinder block 50 together form a crank chamber 9 that accommodates the crankshaft 7. Under the crankcase 8, an oil pan is provided to catch oil descended from above. The top portion of the cylinder block 50 is coupled to a cylinder head 60 that includes an intake port 12 and an exhaust port 13 that are opened and closed by an intake valve 10 and an exhaust valve 11, respectively. An inner wall surface of the cylinder head 60, a top surface of the piston 3, and an inner circumferential surface of the cylinder 2 together define a combustion chamber 14.

Hereinafter, the piston 3 of the internal combustion engine 1 will be described in detail.

Figure 2:
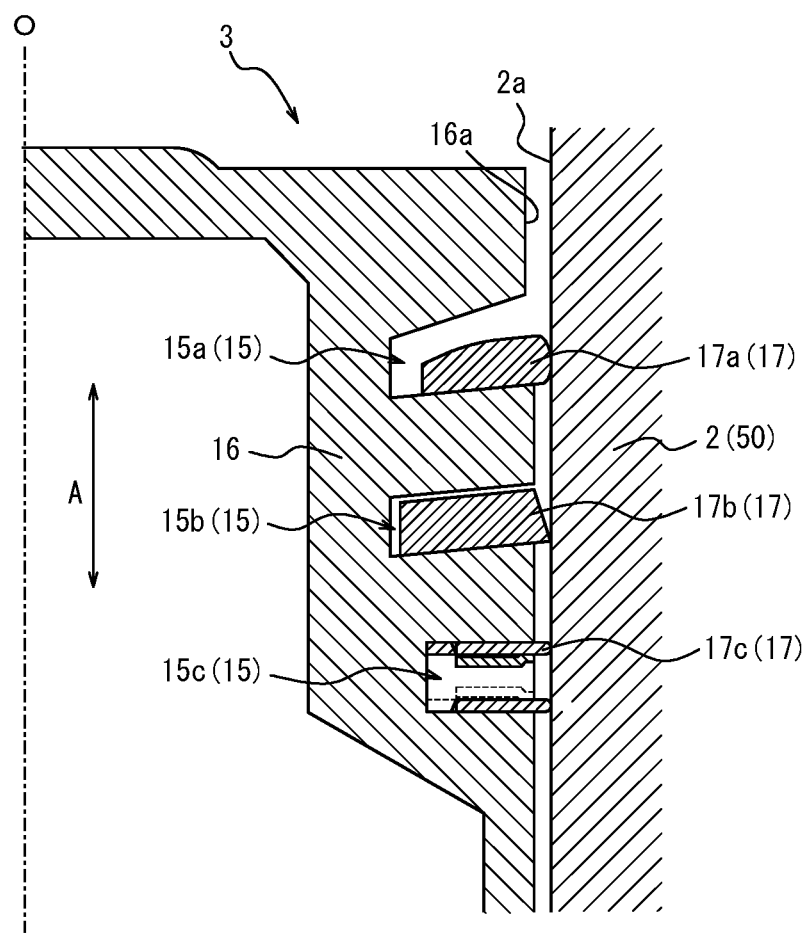
FIG. 2 is a cross-sectional diagram illustrating a portion of a vertical cross-section of the piston illustrated in FIG. 1.

FIG. 2 is a cross-sectional diagram illustrating a portion of a vertical cross-section of the piston 3 that is parallel to and includes a central axis O of the piston 3. As illustrated in FIG. 2, the piston 3 includes a piston body 16 having an outer peripheral surface in which ring grooves 15 are formed, and piston rings 17 fitted into the respective ring grooves 15. In particular, the piston body 16 according to the present embodiment includes a plurality of ring grooves 15 formed thereon. More specifically, on the outer peripheral surface of the piston body 16 according to the present embodiment, three ring grooves 15 are formed: a first ring groove 15*a*, a second ring groove 15*b*, and a third ring groove 15*c*.

The first ring groove 15*a* is positioned closest to the piston crown of the piston body 16 as compared to the second ring groove 15*b* and the third ring groove 15*c* with respect to a direction (hereinafter, referred to as "central axis direction A") parallel to the central axis O (equivalent to the central axis of the piston body 16) of the piston 3. In other words, the first ring groove 15*a* is positioned uppermost among the plurality of ring grooves 15 with respect to the central axis direction A.

The second ring groove 15*b* is positioned between the first ring groove 15*a* and the third ring groove 15*c* in the central axial direction A.

The third ring groove 15*c* is positioned in the lower portion of the piston body 16 below the first ring groove 15*a* and the second ring groove 15*b*. In other words, the third ring groove 15*c* is positioned lowermost among the plurality of ring grooves 15 in the central axis direction A.

A piston ring 17 is fitted into each of the first ring groove 15*a* and the second ring groove 15*b*. Also, in a manner different from the first ring groove 15*a* and the second ring groove 15*b*, a piston ring 17 formed by three components is fitted into the third ring grooves 15*c*. In particular, a first ring 17*a* is fitted into the first ring groove 15*a*, and a second ring 17*b* is fitted into the second ring groove 15*b*. A third ring 17*c* is fitted into the third ring groove 15*c*.

The first ring 17*a* is a so-called "first pressure ring" for suppressing escape of a compressed gas (i.e., blow-by gas) from the combustion chamber 14 to the crankcase 8. In particular, an outer peripheral surface of the first ring 17*a* slides on the inner surface 2*a* of the cylinder 2 via a lubricating oil under a predetermined pressure, whereby the occurrence of the blow-by gas described above is suppressed.

The third ring 17*c* is a so-called "oil ring" which prevents scorching of the piston 3 by scraping off excess engine oil attached to the inner wall 2*a* of the cylinder 2 and forming an appropriate oil film. In particular, the outer peripheral surface of the third ring 17*c* slides on the inner wall 2*a* of the cylinder 2 under a predetermined pressure and forms an appropriate oil film on the inner wall 2*a* of the cylinder 2. Note that the third ring 17*c* can be realized by various configurations.

The second ring 17*b* is a so-called "second pressure ring" for aiding the first ring 17*a* serving as the first pressure ring and suppressing the occurrence of blow-by gas as described above. The second ring 17*b* also has a function of assisting the third ring 17*c* serving as the oil ring. That is, the outer peripheral surface of the second ring 17*b* slides on the inner wall 2*a* of the cylinder 2 via the lubricating oil under a predetermined pressure, and thus suppresses blow-by gas as described above and scrapes off excessive engine oil on the inner wall 2*a* of the cylinder 2.

The piston body 16 of the piston 3 is made of aluminum alloy, and the piston ring 17 is made of steel or cast iron.

Figure 3:
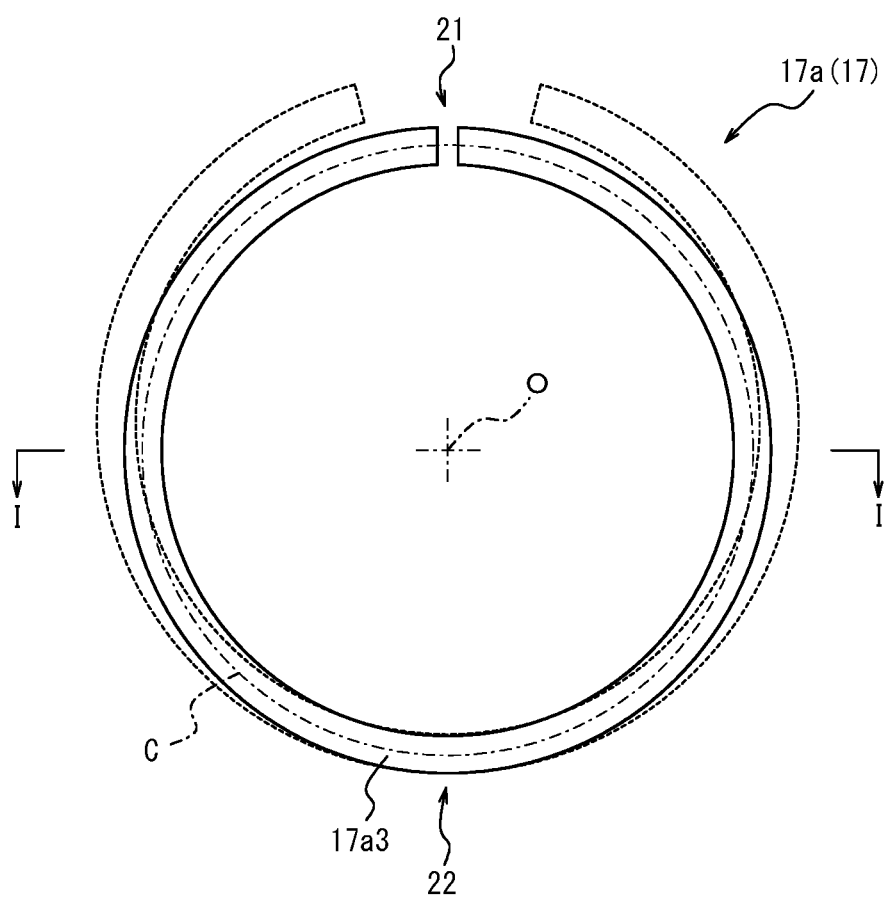
FIG. 3 is a top view of a first ring illustrated in FIG. 2.
Figure 4A:
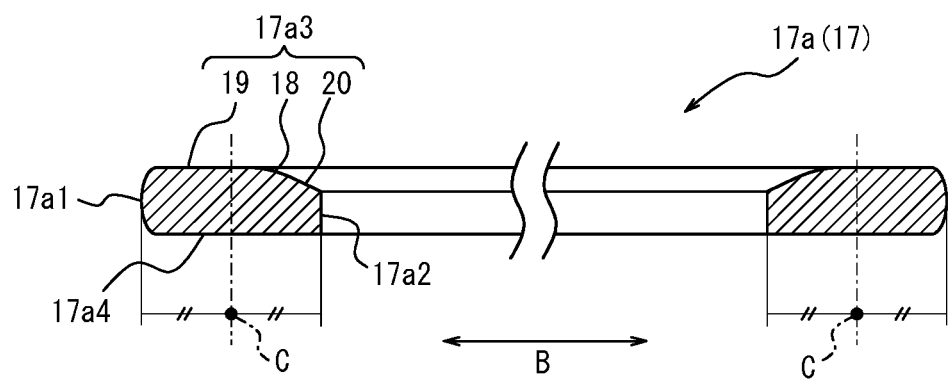
FIG. 4A is a cross-sectional diagram of the broken line of FIG. 3 sectioned along I-I.
Figure 4B:
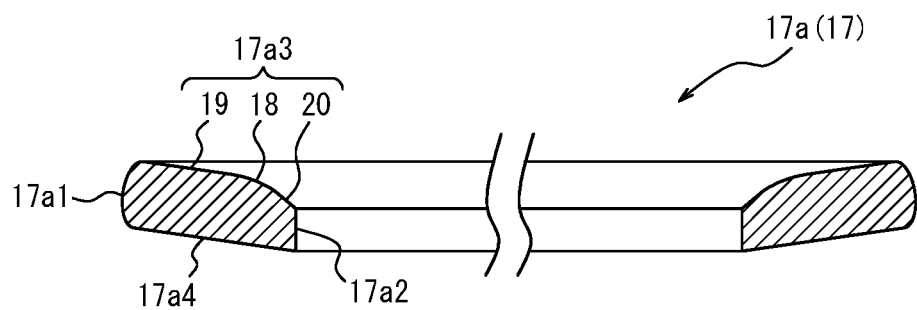
FIG. 4B is a cross-sectional diagram of the solid line FIG. 3 sectioned along I-I.

Hereinafter, configurations of the first ring 17*a* according to an embodiment of the piston ring of the present disclosure, and the first ring groove 15*a* having the first ring 17*a* fitted thereinto will be described in detail. FIG. 3 is a top view of the first ring 17*a*, and FIG. 4A and FIG. 4B are cross-sectional diagrams taken from line I-I of FIG. 3, i.e., diagrams illustrating a cross-section of the first ring 17*a* in a direction orthogonal to the circumferential direction of the first ring 17*a*. In FIG. 3, the broken line indicates the first ring 17*a* in a free state in which an external force is not applied thereto before the first ring 17*a* is incorporated into the cylinder 2, and the solid line indicates the first ring 17*a* in a compressed state in which the first ring 17*a* is incorporated into the cylinder 2 together with the piston body 6 and subjected to an external force from the inner wall 2*a* of the cylinder 2; that is, the solid line indicates the first ring 17*a* in a closed state to match the inner diameter of the cylinder 2 (hereinafter, also referred to simply as "incorporated state"). FIG. 4A is a cross-sectional diagram of the first ring 17*a* indicated by the broken line taken from line I-I of FIG. 3, and FIG. 4B is a cross-sectional diagram of the first ring 17*a* indicated by the solid line taken from line I-I of FIG. 3. FIG. 5 is an enlarged cross-sectional diagram illustrating a portion that includes the first ring 17*a* and the first ring groove 15*a* of the cross-sectional diagram of FIG. 2. In other words, FIG. 5 is an enlarged cross-sectional diagram of the incorporated state of the first ring 17*a*.

As illustrated in FIG. 4A, FIG. 4B, and FIG. 5, the first ring 17*a* of the present embodiment includes an outer peripheral surface 17*a*1 that slides on the inner wall 2*a* of the cylinder 2 via the lubricating oil, an inner peripheral surface 17*a*2 located on the opposite side of the outer peripheral surface 17*a*1, a top surface 17*a*3 located on a piston crown side of the piston body 16, and a bottom surface 17*a*4 located on the opposite side of the top surface 17*a*3.

The outer peripheral surface 17*a*1 of the first ring 17*a* is a barrel-like surface formed as a curved surface having a substantially fixed radius of curvature in a cross-sectional view as illustrated in FIG. 4A, FIG. 4B, and FIG. 5. However, the outer peripheral surface 17*a*1 of the first ring 17*a* is not limited to the barrel-like surface of the present embodiment and may take various shapes such as, for example, a tapered face formed by a slope inclined at a fixed angle relative to the central axis or a combination of a plurality of slopes inclined at different angles relative to the central axis.

The inner peripheral surface 17*a*2 of the first ring 17*a* has an approximate uniform surface when the first ring 17*a* is in the free state as illustrated in FIG. 4A.

As illustrated in FIG. 4A, the top surface 17*a*3 of the first ring 17*a* includes a convex portion 18, a planar portion 19, and an inclined peripheral portion 20. The convex portion 18 is formed between an inner edge position and a central position C at which a thickness of the first ring 17*a* in the radial direction B is ½ in the free state and extends toward the bottom surface 17*a*4 of the first ring 17*a* with convergence in a radially inward direction of the radial direction B. The planar portion 19 is continuous with the convex portion 18 on an outer side of the convex portion 18 in the radial direction B of the first ring 17*a*. The inclined peripheral portion 20 is continuous with the convex portion 18 on an inner side of the convex portion 18 in the radial direction B and inclined toward the bottom surface 17*a*4 of the first ring 17*a* with convergence in the radially inward direction in a manner different from the planar portion 18. Although both the convex portion 18 and the inclined peripheral portion 20 extend toward the bottom surface 17*a*4 of the first ring 17*a* with convergence in the radially inward direction, the convex portion 18 of the present embodiment has an arc shape whereas the inclined peripheral portion 20 has a linear shape as illustrated in the cross-sectional diagrams of FIG. 4A, FIG. 4B, and FIG. 5. Note that "inner edge position" as used herein refers to an intersection of the top end portion of the inner peripheral portion 17*a*2 and the inclined peripheral portion 20. In a case in which the inclined peripheral portion 20 is not provided and the top end portion of the inner peripheral surface 17a2 and the convex portion 18 are directly continuous with each other, "the inner edge position" refers to an intersection of the inner peripheral surface 17a2 and the convex portion 18 (see FIG. 7 and FIG. 8).

Figure 6A:
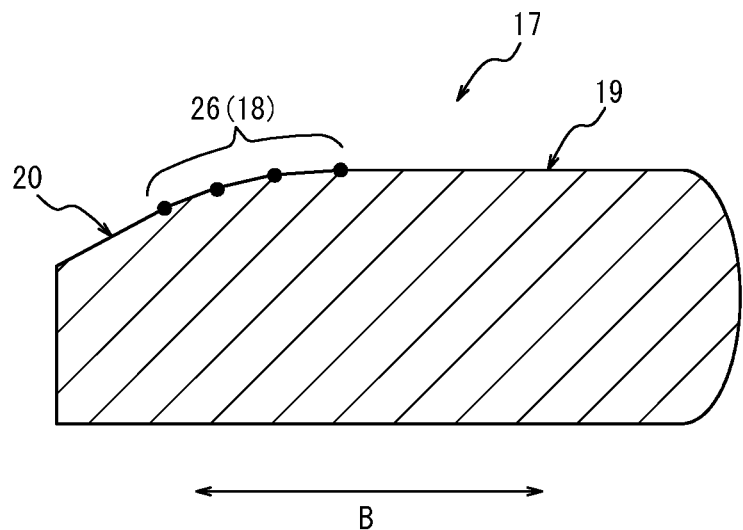
FIG. 6A and FIG. 6B are diagrams illustrating variations of a top surface of the first ring illustrated in FIG. 5.

Here, the convex portion 18 of the present embodiment is formed by a curved surface having an arc shape in the cross-sectional view of FIG. 4A and FIG. 4B but is not limited thereto. The convex portion 18 may have any convex shape that gradually decreases the width of the piston ring 17 as located inward (toward the inner peripheral side) in the radial direction B, that is, any convex shape that extends toward the bottom surface of the piston ring 17 with convergence in the radially inward direction. Thus, the convex portion 18 may be a multi-step convex portion 26 formed in a convex shape by a plurality of straight lines in the ring cross-section orthogonal to the circumferential direction of the piston ring 17 as illustrated in FIG. 6A by way of example. Although the multi-step convex portion 26 of FIG. 6A includes three straight lines that are inclined at different angles and continuous to one another, the multi-step convex portion 26 may be formed by two straight lines, or four or more straight lines. In FIG. 6A, the black dots are provided to clearly indicate the intersections of the three straight lines.

Figure 6B:
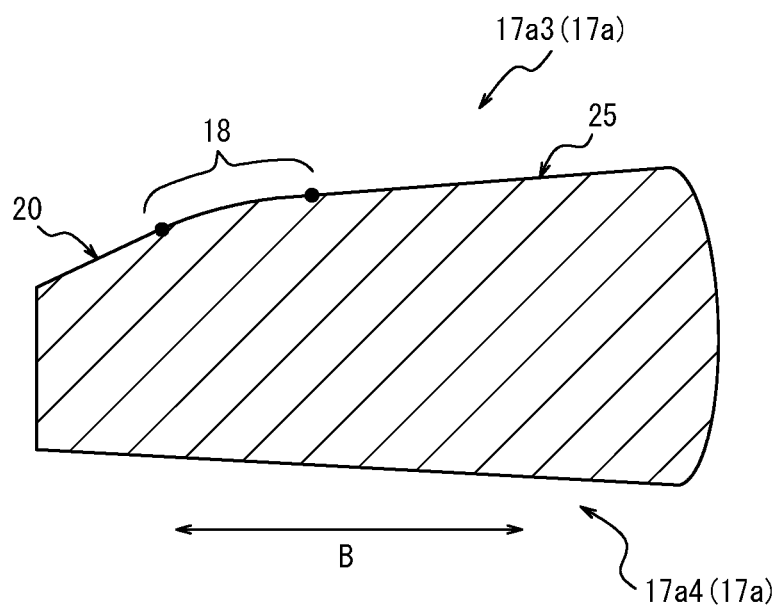

Further, the top surface 17a3 of the first ring 17a of the present embodiment includes the convex portion 18, the planar portion 19, and the inclined peripheral portion 20 but is not limited to this configuration. As illustrated in FIG. 6B, for example, the top surface 17a3 may include the convex portion 18, an inclined peripheral portion 25 continuous with the convex portion 18 on the outer side of the convex portion 18 in the radial direction B, and the inclined peripheral portion 20 continuous with the convex portion 18 on the inner side of the convex portion 18 in the radial direction B. Hereinafter, in the configuration illustrated in FIG. 6B, in order to distinguish between the two inclined peripheral portions, the inclined peripheral portion 25 is referred to as "first inclined peripheral portion 25", and the inclined peripheral portion 20 is referred to as "second inclined circumferential surface 20", for convenience of explanation.

As illustrated in FIG. 6B, the first inclined peripheral portion 25 is inclined toward the bottom surface 17a4 of the first ring 17a with convergence in the radially inward direction. As illustrated in FIG. 6B, the second inclined peripheral portion 20 is inclined toward the bottom surface 17a4 of the first ring 17a with convergence in the radially inward direction in a manner steeper than the first inclined peripheral portion 25 described above. That is, although both the first inclined peripheral portion 25 and the second inclined peripheral portion 20 are inclined toward the bottom surface 17a4 of the first ring 17a with convergence in the radially inward direction, the inclination angle of the second inclined peripheral portion 20 is larger than that of the first inclined peripheral portion 25. In the cross-sectional diagram of FIG. 6B, both the first inclined peripheral portion 25 and the second inclined peripheral portion 20 extend linearly. Also, the convex portion 18 illustrated in FIG. 6B is formed by a curved surface and extends in an arc shape in the cross-sectional diagram of FIG. 6B in a manner similar to the present embodiment. In FIG. 6B, the black dots are provided to clearly indicate the intersection of the convex portion 18 and the first inclined peripheral portion 25 and the intersection of the convex portion 18 and the second inclined peripheral portion 20.

As described above, the top surface 17a3 of the first ring 17a serving as a piston ring 17 is not limited to the configuration of the present embodiment described with reference to FIG. 4A, FIG. 4B, and FIG. 5 and may have configurations as illustrated in FIG. 6A and FIG. 6B.

The bottom surface 17a4 of the first ring 17a of the present embodiment is formed by a uniform plane extending parallel to the planar portion 19 of the top surface 17a3 in the free state of the first ring 17a as illustrated in FIG. 4A. Note that the planar portion 19 of the top surface 17a3 and the bottom surface 17a4 extend approximately parallel to each other, regardless of whether the first ring 17a is in the free state (see FIG. 4A) or in the incorporated state (see FIG. 4B and FIG. 5).

As indicated by the solid line in FIG. 3, the first ring 17a has a gap between the ring ends in the incorporated state. Here, the ring ends and the gap in the incorporated state will be collectively referred to as "split portion 21". Also, a portion at a position opposite the split portion 21 across the central axis (corresponds to the central axis O of the piston 3) of the first ring 17a in the incorporated state will be referred to as "opposite-split portion 22".

Here, the first ring 17a is subjected to torsional deformation as illustrated in FIG. 4B during transition from the free state indicated by the broken line in FIG. 3 to the incorporated state indicated by the solid line in FIG. 3. This is because the first ring 17a of the present embodiment includes the convex portion 18 and the inclined peripheral portion 20 that together form an inner notch on the inner peripheral side of the top surface 17a3 as illustrated in FIG. 4A, FIG. 4B, and FIG. 5. In particular, when the first ring 17a is deformed by the transition from the free state indicated by the broken line in FIG. 3 to the incorporated state indicated by the solid line in FIG. 3, the first ring 17a is subjected to torsional deformation in a helical manner, curving toward the top surface 17a3 due to the influence by the inner notch described above, as illustrated in FIG. 4B and FIG. 5. Because the first ring 17a includes the split portion 21 in the incorporated state as described above, the degree of the torsional deformation is relatively small in the vicinity of the split portion 21 and relatively large in the vicinity of the opposite-split portion 22.

Next, a relationship between a top surface 15a1 of the first ring 15a and the top surface 17a3 of the first ring 17a in the incorporated state in which the piston body 16 and the first ring 17a fitted into the first ring groove 15a are incorporated into the cylinder 2 will be described with reference to FIG. 5. FIG. 5 illustrates the incorporated state in which the piston body 16 and the first ring 17a are incorporated into the cylinder 2 as described above and, simultaneously, a cool state in which the internal combustion engine 1 is in a cool period. Hereinafter, "the incorporated state and, simultaneously, the cool state" will also be referred to simply as a "predetermined state".

In the cross-sectional diagram of the predetermined state illustrated in FIG. 5, the internal combustion engine 1 is configured so that an angle $\theta$ between the top surface 15a1 of the first ring groove 15a and the planar portion 19 is 18 arcminutes or more. This configuration can reduce a pressure generated when the outer peripheral portion of the top surface 17a3 of the first ring 17a contacts the top surface 15a1 of the first ring groove 15a due to secondary behavior of the piston body 16 and behavior of the first ring 17a. Consequently, uneven abrasion of a portion of the top surface 15a1 of the first ring groove 15a in the vicinity of a first piston land outer peripheral surface 16a and uneven abrasion of an outer peripheral portion of the top surface 17a3 of the first ring 17a can be suppressed. The reason for setting the angle $\theta$ to 18 arcminutes or more will be described in detail later (see FIG. 12A and FIG. 12B).

Further, because the top surface 17a3 of the first ring 17a includes the convex portion 18 formed between the inner edge position and the central position C at which the thickness in the radial direction B is ½ as described above, an area of an inner peripheral portion of the top surface 17a3 of the first ring 17a that comes into contact with the top surface 15a1 of the first ring 15a is increased, dispersing the pressure by the contact. Thus, uneven abrasion of a portion of the top surface 15a1 of the first ring groove 15a in the vicinity of a groove bottom 15a2 and uneven abrasion of the inner peripheral portion of the top surface 17a3 of the first ring 17a can be suppressed.

As described above, by setting the relative angle θ between the top surface 15a1 of the first ring groove 15a and the planar portion 19 to at least 18 arcminutes in a cross-sectional view in the predetermined state illustrated in FIG. 5 and, simultaneously, by providing the convex portion 18 on the inner peripheral portion of the top surface 17a3 of the first ring 17a, uneven abrasion of the portion of the top surface 15a1 of the first ring groove 15a in the vicinity of the groove bottom 15a2 and uneven abrasion of the inner peripheral portion and the outer peripheral portion of the top surface 17a3 of the first ring 17a can be suppressed.

Here, the convex portion 18 of the top surface 17a3 of the first ring 17a has a radius of curvature of at least 0.5 mm in the cross-section including the central axis O (see FIG. 4 and FIG. 5). Here, when the convex portion 18 is formed by a curved surface, the radius of curvature of the convex portion 18 in the cross-section including the central axis O (see FIG. 4 and FIG. 5) refers to the radius of curvature of the curved surface. When the convex portion 18 is formed by a multi-step surface formed by a plurality of straight lines in the above cross-section, the radius of curvature refers to a radius of curvature of an arc defined by two points at both ends of the multi-step surface and an apex located at or in the vicinity of the center between the two points.

In the present embodiment, the relative angle θ is at least 18 arcminutes and, simultaneously, the convex portion 18 is provided in the inner peripheral portion of the top surface 17a3 of the first ring 17a. However, by providing the convex portion 18 in the inner peripheral portion of the top surface 17a3 of the first ring 17a regardless of the value of the relative angle θ, uneven abrasion of the portion of the top surface of the ring groove in the vicinity of the groove bottom having the first ring 17a fitted thereinto and uneven abrasion of the inner peripheral portion of the top surface 17a3 of the first ring 17a can be suppressed.

In the present embodiment, the width of the first ring 17a (the distance between the planar portion 19 of the top surface 17a3 and the bottom surface 17a4) is 1.0 mm to 2.0 mm. By setting the radius of curvature of the convex portion 18 to at least 0.5 mm, an effect whereby the maximum value of Hertzian stress is reduced can be expected, and the pressure by the contact can be largely dispersed. The reason for setting the radius of curvature of the convex portion 18 to at least 0.5 mm will be described in detail later (see FIG. 13).

The first ring groove 15a includes the top surface 15a1 that is formed by a circumferential surface inclined at an acute angle relative to the plane orthogonal to the center axis O, the groove bottom 15a2, and the bottom surface 15a3 that is located opposite the top surface 15a1 and formed by a circumferential surface inclined at an acute angle smaller than the angle of the top surface 15a1 relative to the plane orthogonal to the central axis O.

As described above, the angle θ between the top surface 15a1 of the first ring groove 15a and the planar portion 19 is 18 arcminutes or more in the cross-sectional view in the predetermined state illustrated in FIG. 5. Preferably, the angle θ is realized by setting an angle α between the top surface 15a1 of the first ring groove 15a and the plane orthogonal to the central axis O to 30 to 180 arcminutes. By securing the angle α of the top surface 15a1 of the first ring groove 15a at a relatively large angle so that the first ring groove 15a is widened toward the first piston land outer peripheral surface 16a, the angle θ can be easily secured at 18 arcminutes or more as described above. Further, the angle θ is preferably realized by setting an angle β between the planar portion 19 of the first ring 17a and the plane orthogonal to the central axis O to 0 arcminutes or more in the cross-sectional view in the predetermined status illustrated in FIG. 5. Here, the values of the angle α and the angle β are obtained by defining an upward inclination toward the piston crown of the piston body 16 from the plane orthogonal to the central axis direction A as being at a positive angle. When the angle α is less than 30 arcminutes, an operation range of the first ring groove 15a having a twist angle is reduced, and its outer peripheral portion is likely to suffer abrasion. Also, when the angle α is larger than 180 arcminutes, the inner peripheral portion is likely to suffer abrasion, and side gaps (a gap between the top surface of the first ring groove 15a and the top surface of the first ring 17a and a gap between the bottom surface of the first ring groove 15a and the bottom surface of the first ring 17a) are increased, which tends to increase the blow-by gas. Accordingly, the angle α is preferably set to 30 to 180 arcminutes.

Also, the angle θ described above preferably corresponds to an angle at the position of the opposite-split portion 22 in the circumferential direction of the first ring 17a. As described above, torsional deformation becomes relatively large at the position of the opposite-split portion 22. That is, the position of the opposite-split portion 22 is the position where the angle β described above becomes maximum in the circumferential direction of the first ring 17a and also a position that is most likely to come into contact with the top surface 15a1 of the first ring groove 15a. Thus, by setting the angle θ described above at the position of the opposite-split portion 22 to 18 arcminutes or more, uneven abrasion of the top surface 15a1 of the first ring 15a and uneven abrasion of the top surface 17a3 of the first ring 17a can be more reliably suppressed.

Although the first ring groove 15a and the first ring 17a fitted into the first ring groove 15a have been described above, the relationship of angle θ and the configuration of the convex portion 18 may be applied to the second ring groove 15b and the second ring 17b fitted into the second ring groove 15b. However, it is particularly preferable to apply the relationship of the angle θ and the configuration of the convex portion 18 to the first ring grove 15a located uppermost in the central axis direction of the piston body 16 (i.e., the same direction as the central axis direction A of the piston 3) and the first ring 17a fitted into the first ring groove 15a. The first ring groove 15a is located close to the combustion chamber 14 and tends to be subjected to slight thermal deformation during hot periods. Thus, when the relationship associated with the angle θ described above is applied to the first ring groove 15a and the first ring 17a as described in the present embodiment, the contact between the top surface of the ring groove 15 and the top surface of the piston ring 17 can be more efficiently suppressed, rather than when the relationship associated with the angle θ is applied to the second ring groove 15b and the second ring 17b.

Figure 7:
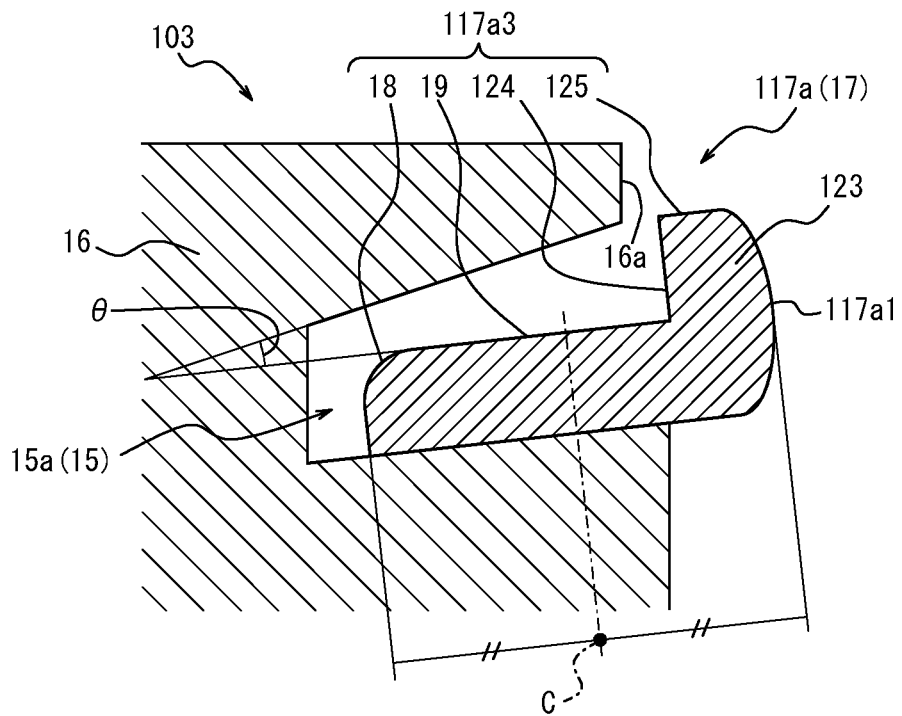
FIG. 7 is a diagram illustrating a variation of the first ring illustrated in FIG. 5.

Further, the first ring 17a serving as a piston ring 17 illustrated in the present embodiment has a ring cross-sectional shape as illustrated in FIG. 4 and FIG. 5. However, the first ring 17a may have any ring cross-sectional shape that includes a convex portion that is formed between the inner edge position and the central position C at which the thickness in the radial direction B is ½ and extends toward the bottom surface with convergence in the radially inward direction, and at least one of a planar portion and a first inclined peripheral portion (e.g., see the first inclined peripheral portion 25 in FIG. 6B) that is continuous with the convex portion on the outer side of the convex portion in the radial direction B. Thus, the piston ring 17 may have a cross-sectional shape as illustrated in FIG. 7, for example. Note that FIG. 7 illustrates a predetermined state similar to that of FIG. 5.

The first ring 117a serving as the piston ring 17 illustrated in FIG. 7 is different from the first ring 17a described above in terms of having an outer peripheral wall portion 123 protruding toward the piston crown of the piston body 16 in the central axis direction A in an outer peripheral portion of a top surface 117a3. Further, unlike the first ring 17a described above, the first ring 117a illustrated in FIG. 7 does not include the inclined peripheral surface 20. In other words, the top surface 117a3 of the first ring 117a illustrated in FIG. 7 includes the convex portion 18 formed by a curved surface, the planar portion 19, an upright portion 124, and a top portion 125. The configurations of the convex portion 18 and the planar portion 19 are the same as those of the first ring 17a illustrated in FIG. 5, and thus descriptions thereof will be omitted here.

The upright portion 124 formed by the outer peripheral wall portion 123 is a surface extending in a direction approximately orthogonal to the planar portion 19 in the cross-sectional view of FIG. 7. Further, the top portion 125 serves as a top surface of the outer peripheral wall portion 123. The outer peripheral wall portion 123 is located radially outward from the first piston land outer peripheral surface 16a of the piston body 16 and is clamped between the first piston land outer peripheral surface 16a and the inner wall 2a of the cylinder 2 (see FIG. 1, etc.) when the piston 103 reciprocates within the cylinder 2 (see FIG. 1, etc.). Thus, the outer peripheral surface of the outer peripheral wall portion 123 which constitutes a portion of an outer peripheral surface 117a1 of the first ring 117a slides on the inner wall 2a of the cylinder 2 via a lubricating oil at a position opposing the first piston land outer peripheral surface 16a.

In the first ring 117a having the cross-sectional shape illustrated in FIG. 7, the angle θ between the planar portion 19 of the top surface 117a3 and the top surface 15a1 of the first ring groove 15a is at least 18 arcminutes, in a manner similar to angle θ between the first ring groove 15a and the first ring 17a illustrated in FIG. 5. Further, the convex portion 18 is formed between the inner edge position and the central position C at which the radial direction thickness is ½ on the top surface 117a3. Thus, the configuration illustrated in FIG. 7 can also suppress uneven abrasion of the top surface 15a1 of the first ring groove 15a and the top surface 117a3 of the first ring 117a.

Figure 8:
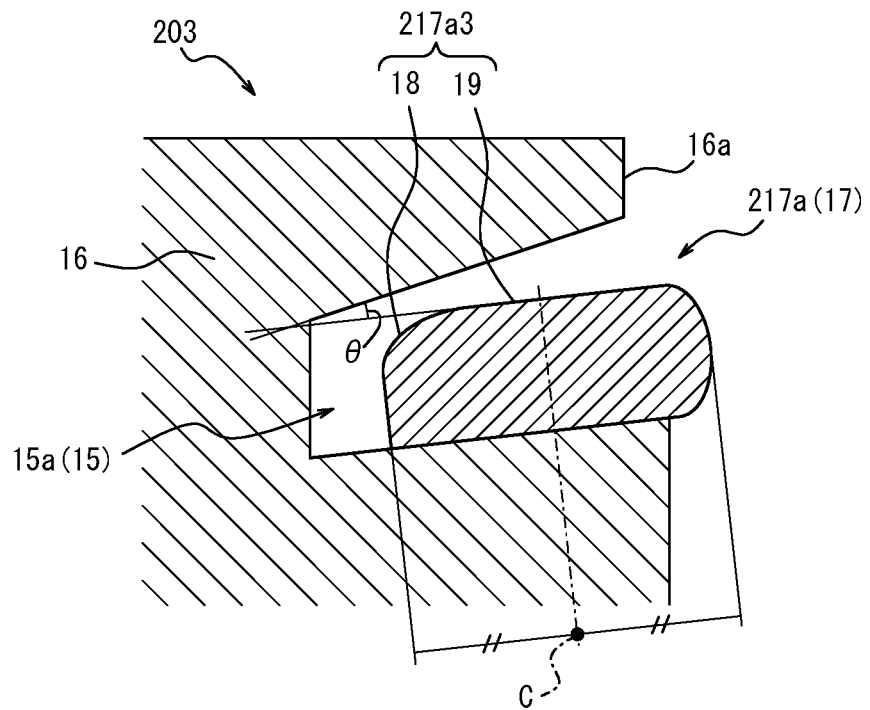
FIG. 8 is a diagram illustrating another variation of the first ring illustrated in FIG. 5.

Note that, in place of the piston 103 that includes the first ring 117a illustrated in FIG. 7, a piston 203 that includes a first ring 217a having a cross-sectional shape as illustrated in FIG. 8 may be used. The first ring 217a illustrated in FIG. 8 has a configuration similar to the configuration of the first ring 117a illustrated in FIG. 7, except for not including the outer peripheral wall portion 123. That is, a top surface 217a3 of the first ring 217a illustrated in FIG. 8 is formed by the convex portion 18 and the planar portion 19.

Next, the angle θ described above will be described in detail.

Figure 9:
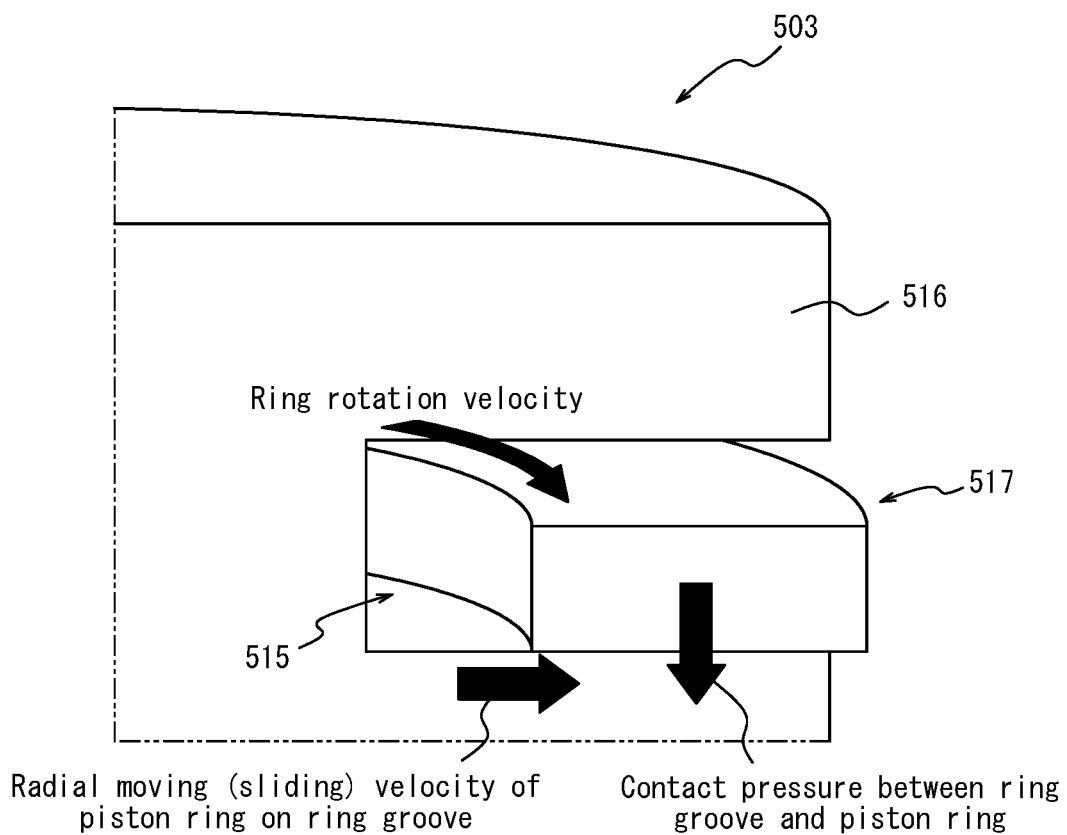
FIG. 9 is a diagram schematically illustrating a typical piston.

FIG. 9 is a diagram schematically illustrating a typical piston 503 that includes a piston body 516 having a ring groove 515 formed therein and a piston ring 517 fitted into the ring groove 515. As illustrated in FIG. 9, the piston ring 517 may be rotated relative to the piston body 516 during hot periods of an internal combustion engine. Further, the piston ring 517 may slide in the radial direction. According to Archard's abrasion equation, an abrasion amount W between metals is proportional to the product of a contact pressure and a sliding distance. Using this equation, an index of the abrasion amount is estimated from a sliding time and a sliding velocity.

Figure 10:
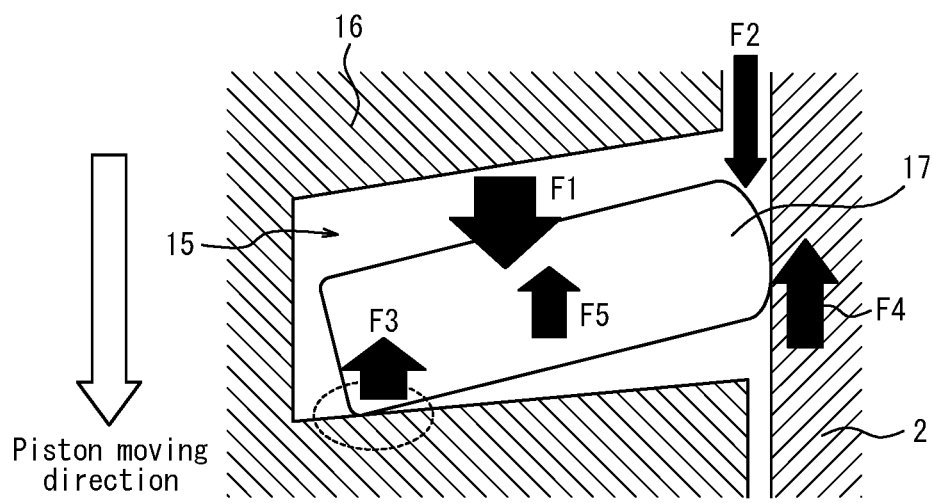
FIG. 10 is a diagram schematically illustrating forces applied to the first ring when the ring is fitted and the internal combustion engine is in a hot period.

Here, FIG. 10 schematically illustrates forces applied to the piston ring 17 fitted into the ring groove 15 in the incorporated state during the hot period of the internal combustion engine 1. As illustrated in FIG. 10, the piston ring 17 receives a force due to a squeeze effect caused by gas and an oil film within the ring groove 15 (denoted by "F1" in FIG. 10 and will be simply referred to as "F1" hereinafter), a gas pressure outside the ring groove 15 (denoted by "F2" in FIG. 10 and will be simply referred to as "F2" hereinafter), a reaction force by a solid contact (denoted by "F3" in FIG. 10 and will be simply referred to as "F3" hereinafter), an outer peripheral frictional force (denoted by "F4" in FIG. 10 and will be simply referred to as "F4" hereinafter), and an inertial force of the piston ring 17 (denoted by "F5" in FIG. 10 and will be simply referred to as "F5" hereinafter). The distribution of surface pressure at the contact portions between the top surface of the ring groove 15 and the top surface of the piston ring 17 and between the bottom surface of the ring groove 15 and the bottom surface of the piston ring 17 (see the position surrounded by the broken line in FIG. 10) is caused by the balance of the forces described above.

Thus, by calculating the behaviors of the piston body 16 and the piston ring 17, which affect the abrasion amount, and the force of the piston ring 17, an index value correlated with the abrasion amount can be calculated. In particular, the behaviors of the piston body 16 and the piston ring 17 within the engine are analyzed and calculated, a calculation result thus obtained is used to perform a structural analysis calculation, and the pressure generated in the ring groove 15 in the engine during operation is computed. From the pressure, behavior speeds, and behavior states of the piston body 16 and the piston ring 17 at that time, the abrasion amount generated in the ring groove 15 is estimated.

Figure 11:
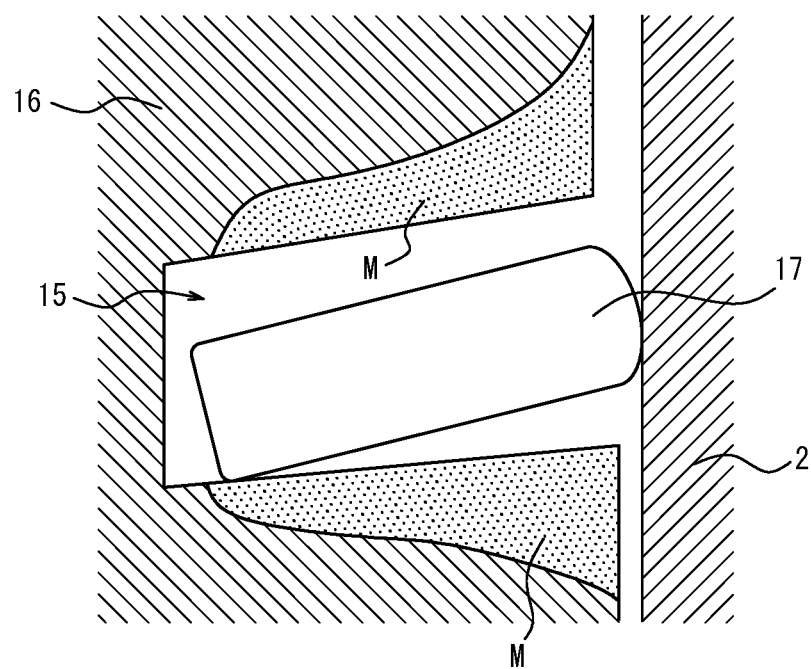
FIG. 11 is a diagram schematically illustrating abrasion states of a top surface and a bottom surface of the ring groove.

In this way, the index values that enable estimation of the abrasion amounts on the top and bottom surfaces of the ring groove 15 are calculated. FIG. 11 is a diagram schematically illustrating distributions of the abrasion amounts of the top and bottom surfaces of the ring groove 15 of the piston body 16 that has the piston ring 17 having a regular rectangular shape fitted thereinto. The calculated index values enable estimation of the abrasion amounts illustrated in FIG. 11 and an increase or decrease of the abrasion amounts according to a change in the design dimensions. In FIG. 11, the abrasion amounts of the top and bottom surfaces of the ring groove 15 are depicted by the respective dotted areas (denoted by M in FIG. 11). As illustrated in FIG. 11, the abrasion amount of the top surface of the ring groove 15 increases in a portion in the vicinity of the piston land outer peripheral surface. Thus, by suppressing the top surface of the piston ring 17 from contacting the portion of the ring groove 15 in the vicinity of the piston land outer peripheral surface, the abrasion amount of the portion of the top surface of the ring groove 15 in the vicinity of the piston land outer peripheral surface can be suppressed. As such, for example, by increasing the angle α between the plane orthogonal to the central axis of the piston body 16 and the top surface of the piston ring 15 (see FIG. 5), a large value of the angle θ between the top surface of the piston ring 17 and the top surface of the ring groove 15 is secured, whereby abrasion in the portion of the top surface of the ring groove in the vicinity of the piston land outer peripheral surface can be suppressed.

As illustrated in FIG. 11, however, it is anticipated that relatively large abrasion occurs in the portion of the top surface of the ring groove 15 in the vicinity of the groove bottom, even though abrasion in this portion will not be as severe as that in the portion in the vicinity of the piston land outer peripheral surface. Thus, when the angle θ described above is set to be too large, there is a risk that the abrasion amount is increased in the portion in the vicinity of the groove bottom due to concentration of the contact pressure in the portion of the top surface of the ring groove 15 in the vicinity of the groove bottom.

From the above, we have found that it is important to suppress abrasion of the top surface of the ring groove 15 in the vicinity of the piston land outer peripheral surface by setting the angle θ to a predetermined range and also to suppress an increase in abrasion in the portion of the ring grove 15 in the vicinity of the groove bottom, in order to suppress abrasion of the top surface of the ring groove 15. Thus, we have found a configuration that can suppress abrasion in both the portions described above through experiment.

Figure 12A:
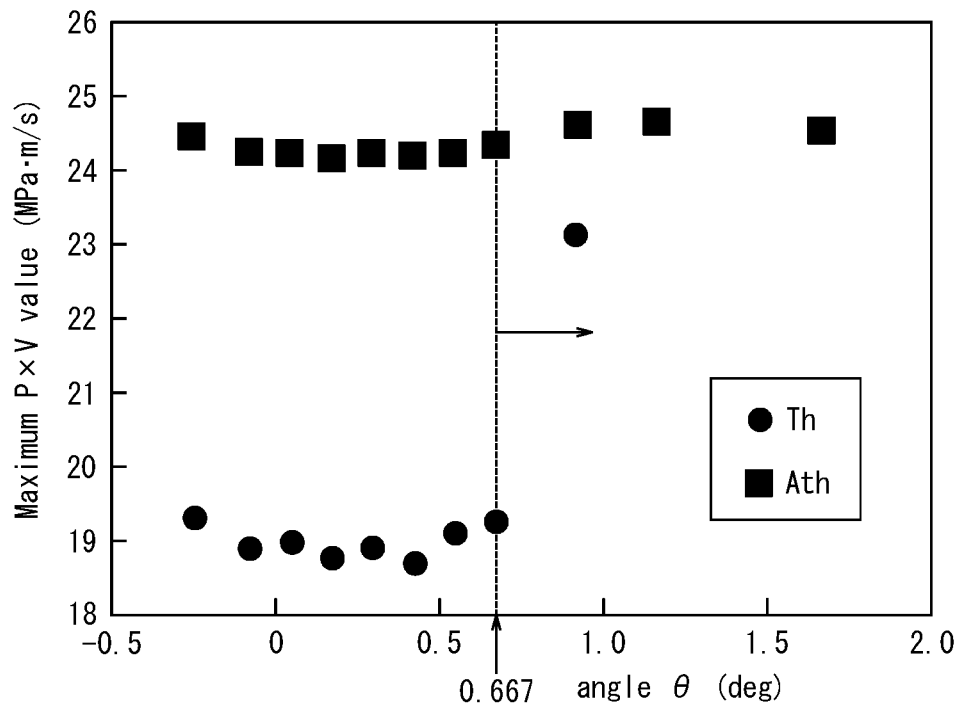
FIG. 12A is a graph illustrating evaluated abrasion amounts of a portion of the top surface of the ring groove in the vicinity of the groove bottom with respect to a thrust direction and an anti-thrust direction.
Figure 12B:
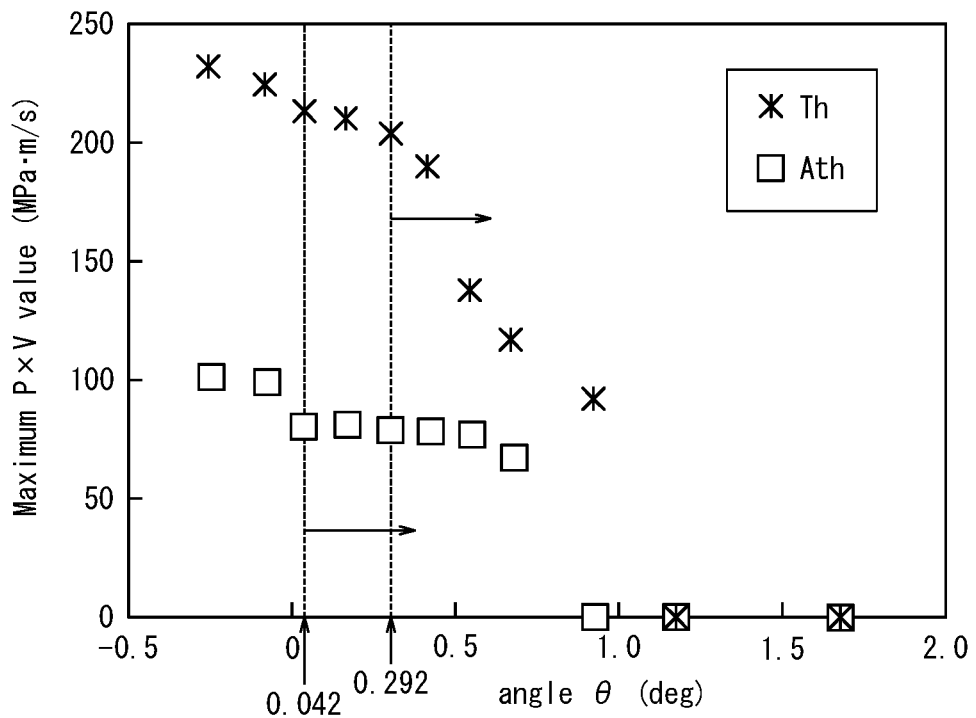
FIG. 12B is a graph illustrating evaluated abrasion amounts of a portion of the top surface of the ring groove in the vicinity of a piston land outer peripheral surface with respect to the thrust direction and the anti-thrust direction.

FIG. 12A illustrates evaluations of the abrasion amount in the portion of the top surface of the ring groove 15 in the vicinity of the groove bottom, with respect to a thrust direction (denoted by "Th" in FIG. 12A) and an anti-thrust direction (denoted by "Ath" in FIG. 12A). Also, FIG. 12B illustrates evaluations of the abrasion amount in the portion of the top surface of the ring groove 15 in the vicinity of the piston land outer peripheral surface, with respect to the thrust direction and the anti-thrust direction. Each of the horizontal axes in FIG. 12A and FIG. 12B represents the angle θ.

As can be seen in FIG. 12B, with respect to the thrust direction, when the angle θ is 0.292° or more, the abrasion amount in the vicinity of the piston land outer peripheral surface can be reduced. As can be seen in FIG. 12B, also, with respect to the anti-thrust direction, when the angle θ is 0.042° or more, the abrasion amount in the vicinity of the piston land outer peripheral surface can be reduced. It is believed that the reason for the reduction in the abrasion mount with respect to both the thrust direction and anti-thrust direction is that the increase in the angle θ suppresses a localized increase in the contact pressure between the top surface of the piston ring 17 and the top surface of the ring groove 15 and the contact pressure is dispersed into the groove bottom side.

Depending on types of the internal combustion engine, the directions of the thrust direction and the anti-thrust direction are different, and whichever direction is the thrust direction in the elevation view is not fixed. As such, the angle θ for reducing the abrasion amount of the top surface of the ring groove 15 is preferably set to 0.042° or more, and more preferably set to 0.292° or more, and the abrasion amount of the top surface of the ring groove 15 is reduced regardless of the thrust direction and the anti-thrust direction. However, because defining dimensions with the angle θ being less than 0.1° results in a difficulties in processing and a decrease in productivity, as a specification for reducing abrasion in the portion of the ring groove 15 in the vicinity of the piston land outer peripheral surface, the angle θ is preferably set to 0.3° or more (i.e., 18 arcminutes or more).

As can be seen in FIG. 12A, on the other hand, when the angle θ exceeds 0.667°, the abrasion amount in the portion of the top surface of the ring groove 15 in the vicinity of the groove bottom increases with respect to the thrust direction. Based on this finding, for the first ring 17a of the present embodiment described above and the first rings 117a and 217a of the example variations of the present embodiment, the convex portion 18 is formed on the respective inner peripheral sides of the top surface 17a3, 117a3, and 217a3 that come into contact with the portion of the top surface of the ring groove 15 in the vicinity of the ring groove 15. By virtue of the convex portion 18, the contact pressure in the portion of the top surface of the ring groove 15 in the vicinity of the groove bottom can be widely dispersed, and the increase in the abrasion amount as illustrated in FIG. 12A can be suppressed.

For the above reasons, in the internal combustion engine 1 according to the above embodiment, the angle θ is set to 18 arcminutes or more, and the convex portion 18 is formed on the inner peripheral sides of the top surfaces 17a3, 117a3, and 217a3 of the first rings 17a, 117a, and 217a, respectively, each serving as piston rings 17. Thus, uneven abrasion of the top surface of the ring groove 15 and, also, uneven abrasion of the top surfaces 17a3, 117a3, and 217a3 of the first rings 17a, 117a, and 217a, respectively, is suppressed.

In all of the models used in the above analysis, calculations are performed for a commercially available 1.5 L water-cooled 4-cylinder gasoline engine.

Figure 13:
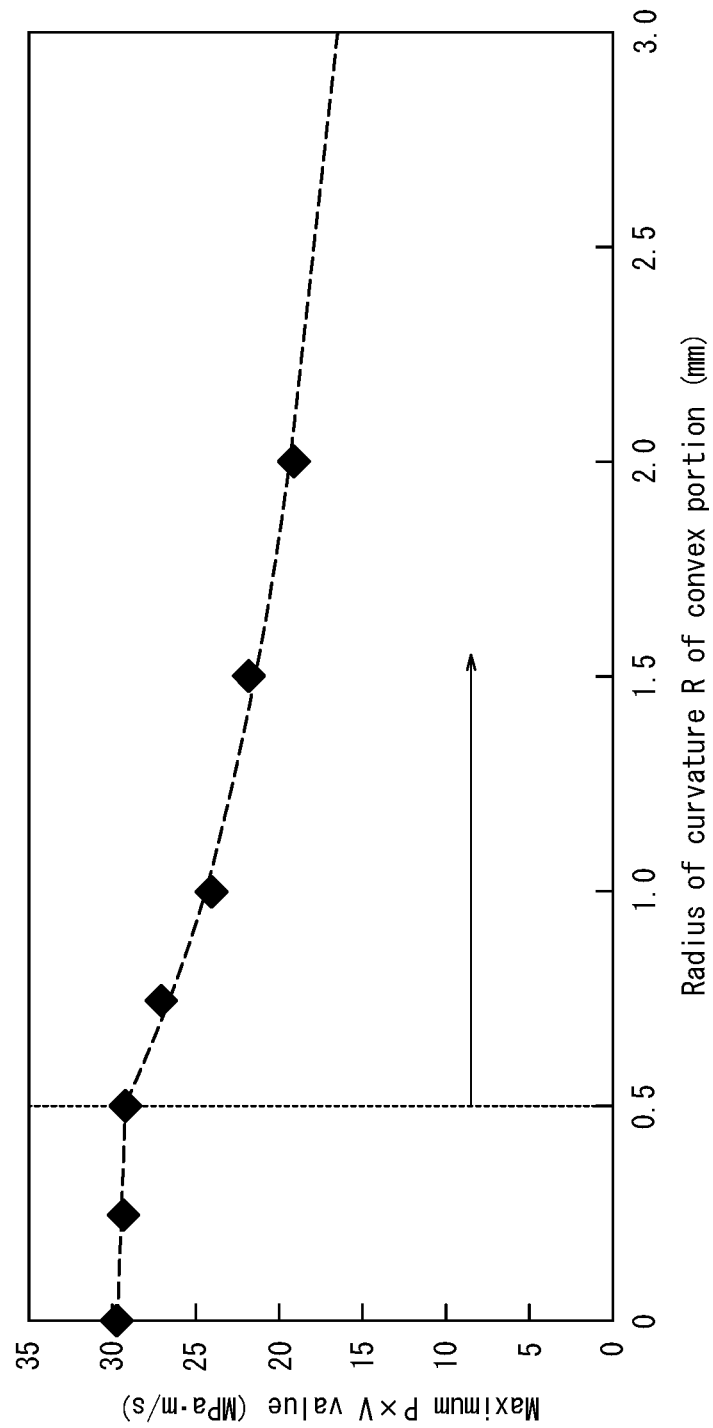
FIG. 13 is a graph illustrating a relationship between a radius of curvature of a convex portion illustrated in FIG. 5 and an abrasion amount of a bottom-side portion of a ring groove.

Next, verification results conducted in respect of the radius of curvature of the convex portion 18 will be described. FIG. 13 is a graph illustrating a relationship between the radius of curvature R (mm) of the convex portion 18 and the abrasion amount of the portion of the ring groove 15 in the vicinity of the groove bottom. FIG. 13 illustrates the abrasion amount of the portion of the top surface of the ring groove 15 in the vicinity of the groove bottom with respect to the thrust direction. As can be seen in FIG. 13, while the abrasion amount hardly changes when the radius of curvature R is less than 0.5 mm, the abrasion amount can be largely reduced when the radius of curvature R is 0.5 mm or more. Thus, the radius of curvature R of the convex portion 18 is preferably set to be 0.5 mm or more.

Note that, except for the radius of curvature R, the same setting conditions are applied to all of the seven models plotted in FIG. 13. In particular, friction coefficients of the top and bottom surfaces of the ring groove 15 and the top and bottom surfaces of the piston ring 17 are set to a fixed value. Also, the relative angle between the bottom surface of the ring groove 15 and the bottom surface of the piston ring 17 is set to a fixed value. The angle θ is also set to a fixed value.

The piston and the piston ring for an internal combustion engine according to the present disclosure should not be construed as being limited to the particular configurations of the embodiments and example variations described above but may be modified in a variety of manners without departing from the scope of the appended claims. For example, although the first rings 17a, 117a, and 217a described above are subjected to torsional deformation in the incorporated state, this may be optional. That is, the angle β in the incorporated state (see FIG. 5) may be 0 arcminutes.

Although the top surface of the piston ring and the top surface of the ring groove have been described above, application of a similar configuration to the bottom surface of the piston ring and the bottom surface of the ring groove enables a similar effect to be obtained. However, it is preferable to set the relative angle θ between the top surface of the piston ring and the top surface of the ring groove to a predetermined angle and form the top surface of the piston ring into the particular shape as described in the above embodiments, because this configuration can more effectively suppress uneven abrasion than a configuration in which similar configurations are applied to the bottom surface of the piston ring and the bottom surface of the ring groove.

INDUSTRIAL APPLICABILITY

The present disclosure relates to a piston for an internal combustion engine and a piston ring.

REFERENCE SIGNS LIST

1: internal combustion engine
2: cylinder
2a: inner wall
3, 103, 203: piston
4: piston pin
5: connecting rod
6: crank pin
7: crankshaft
8: crankcase
9: crank chamber
10: intake valve
11: exhaust valve
12: intake port
13: exhaust port
14: combustion chamber
15: ring groove
15a: first ring groove
15a1: top surface
15a2: groove bottom
15a3: bottom surface
15b: second ring groove
15c: third ring groove
16: piston body
16a: first piston land outer peripheral surface
17: piston ring
17a, 117a, 217a: first ring
17a1, 117a1: outer peripheral surface
17a2: inner peripheral surface
17a3, 117a3, 217a3: top surface
17a4: bottom surface
17b: second ring
17c: third ring
18: convex portion
19: planar portion
20: inclined peripheral portion (second inclined peripheral portion)
21: split portion
22: opposite-split portion
25: inclined peripheral portion (first inclined peripheral portion)
26: multi-step convex portion
50: cylinder block
60: cylinder head
123: outer peripheral wall portion
124: upright portion
125: top portion
503: piston
515: ring groove
516: piston body
517: piston ring
A: central axis direction of piston
B: radial direction of piston ring
C: central position
M: abrasion region
O: central axis of piston (central axis of piston body)
α: angle between top surface of first ring groove and plane orthogonal to central axis of piston in cross-sectional view in predetermined status
β: angle between planar portion of top surface of first ring and plane orthogonal to central axis of piston in cross-sectional view in predetermined status
θ: relative angle between top surface of first ring groove and planar portion of top surface of first ring in cross-sectional view in predetermined status

The invention claimed is:

1. A piston for an internal combustion engine, the piston being movable within a cylinder of the internal combustion engine and including a piston body having a ring groove formed on an outer peripheral surface of the piston body and a piston ring fitted into the ring groove,
wherein the piston ring includes an outer peripheral surface that slides on an inner wall of the cylinder via a lubricating oil, an inner peripheral surface located on the opposite side of the outer peripheral surface, a top surface located on a piston crown side of the piston body, and a bottom surface located on the opposite side of the top surface,
the top surface of the piston ring includes:
a convex portion that is formed between an inner edge position and a central position at which a radial direction thickness is ½, with the piston ring in a free state, and extends so as to approach the bottom surface of the piston ring with convergence in a radially inward direction; and
a planar portion continuous with the convex portion on a radially outer side of the convex portion, or
an inclined peripheral portion that is continuous with the convex portion on a radially outer side of the convex portion and inclined so as to approach the bottom surface of the piston ring with convergence in the radially inward direction,
in a predetermined status in which the piston body and the piston ring are incorporated in the cylinder and the internal combustion engine is in a cool state, an angle between a top surface of the ring groove and the planar portion or the inclined peripheral portion is at least 18 arcminutes in a cross-section that is parallel to a central axis of the piston body and includes the central axis, and
when the inclined peripheral portion is defined as a first inclined peripheral portion, the top surface of the piston ring includes a second inclined peripheral portion that is continuous with the convex portion on a radially inner side of the convex portion and, compared with the planar portion and the first inclined peripheral portion, is inclined so as to approach the bottom surface of the piston ring with convergence in the radially inward direction.

2. The piston for the internal combustion engine according to claim 1,
wherein a radius of curvature of the convex portion in the cross-section is at least 0.5 mm.

3. The piston for the internal combustion engine according to claim 1, wherein the piston ring includes an opposite-split portion located opposite a split portion, and the angle between the top surface of the ring groove and the planar portion or the inclined peripheral portion an angle at a position of the opposite-split portion.

4. The piston for the internal combustion engine according to claim 1, wherein an angle between the top surface of the ring groove and a plane orthogonal to the central axis in the predetermined status is within a range of 30 to 180 arcminutes.

5. The piston for the internal combustion engine according to claim 1, wherein an angle between the planar portion or the inclined peripheral portion and a plane orthogonal to the central axis in the predetermined status is 0 arcminutes or more.

6. The piston for the internal combustion engine according to claim 1, wherein the convex portion of the piston ring is formed by a curved surface or a multi-step convex surface composed of a plurality of straight lines in a ring cross-section orthogonal to a circumferential direction of the piston ring.

7. The piston for the internal combustion engine according to claim 1, wherein a plurality of ring grooves are formed on the outer peripheral surface of the piston body, and the piston ring is fitted into a first ring groove located uppermost in a central axis direction of the piston body among the plurality of ring grooves.

8. The piston for the internal combustion engine according to claim 1, wherein the piston ring has an outer peripheral wall portion protruding toward a piston crown of the piston body in a central axis direction in an outer peripheral portion of the top surface of the piston ring.

9. A piston ring fitted into a ring groove formed on an outer peripheral surface of a piston body, wherein the piston ring includes an outer peripheral surface that slides on an inner wall of the cylinder via a lubricating oil, an inner peripheral surface located on the opposite side of the outer peripheral surface, a top surface located on a piston crown side of the piston body, and a bottom surface located on the opposite side of the top surface, the top surface of the piston ring includes:
a convex portion that is formed between an inner edge position and a central position at which a radial direction thickness is ½, with the piston ring in a free state, and extends so as to approach the bottom surface of the piston ring with convergence in a radially inward direction; and
a planar portion continuous with the convex portion on a radially outer side of the convex portion, or
an inclined peripheral portion that is continuous with the convex portion on a radially outer side of the convex portion and inclined so as to approach the bottom surface of the piston ring with convergence in the radially inward direction, and
when the inclined peripheral portion is defined as a first inclined peripheral portion, the top surface of the piston ring includes a second inclined peripheral portion that is continuous with the convex portion on a radially inner side of the convex portion and, compared with the planar portion and the first inclined peripheral portion, is inclined so as to approach the bottom surface of the piston ring with convergence in the radially inward direction.

10. The piston ring according to claim 9, wherein a radius of curvature of the convex portion in a ring cross-section is at least 0.5 mm.

11. The piston ring according to claim 9, wherein the piston ring has an outer peripheral wall portion protruding toward a piston crown of the piston body in a central axis direction in an outer peripheral portion of the top surface of the piston ring.

12. A piston for an internal combustion engine, the piston being movable within a cylinder of the internal combustion engine and including a piston body having a ring groove formed on an outer peripheral surface of the piston body and a piston ring fitted into the ring groove, wherein a top surface of the piston ring includes:
a convex portion that is formed between an inner edge position and a central position at which a radial direction thickness is ½, with the piston ring in a free state, and extends so as to approach a bottom surface of the piston ring with convergence in a radially inward direction; and
a planar portion continuous with the convex portion on a radially outer side of the convex portion, or
an inclined peripheral portion that is continuous with the convex portion on a radially outer side of the convex portion and inclined so as to approach the bottom surface of the piston ring with convergence in the radially inward direction, in a predetermined status in which the piston body and the piston ring are incorporated in the cylinder and the internal combustion engine is in a cool state, an angle between a top surface of the ring groove and the planar portion or the inclined peripheral portion is at least 18 arcminutes in a cross-section that is parallel to a central axis of the piston body and includes the central axis, and the piston ring has an outer peripheral wall portion protruding toward a piston crown of the piston body in a central axis direction in an outer peripheral portion of the top surface of the piston ring.

13. The piston for the internal combustion engine according to claim 12, wherein a radius of curvature of the convex portion in the cross-section is at least 0.5 mm.

14. The piston for the internal combustion engine according to claim 12, wherein the piston ring includes an opposite-split portion located opposite a split portion, and the angle between the top surface of the ring groove and the planar portion or the inclined peripheral portion an angle at a position of the opposite-split portion.

15. The piston for the internal combustion engine according to claim 12, wherein an angle between the top surface of the ring groove and a plane orthogonal to the central axis in the predetermined status is within a range of 30 to 180 arcminutes.

16. The piston for the internal combustion engine according to claim 12, wherein an angle between the planar portion or the inclined peripheral portion and a plane orthogonal to the central axis in the predetermined status is 0 arcminutes or more.

17. The piston for the internal combustion engine according to claim 12, wherein the convex portion of the piston ring is formed by a curved surface or a multi-step convex surface composed of a plurality of straight lines in a ring cross-section orthogonal to a circumferential direction of the piston ring.

18. The piston for the internal combustion engine according to claim 12,
wherein a plurality of ring grooves are formed on the outer peripheral surface of the piston body, and
the piston ring is fitted into a first ring groove located uppermost in a central axis direction of the piston body among the plurality of ring grooves.

19. A piston ring fitted into a ring groove formed on an outer peripheral surface of a piston body,
wherein a top surface of the piston ring includes:
a convex portion that is formed between an inner edge position and a central position at which a radial direction thickness is ½, with the piston ring in a free state, and extends so as to approach a bottom surface of the piston ring with convergence in a radially inward direction; and
a planar portion continuous with the convex portion on a radially outer side of the convex portion, or
an inclined peripheral portion that is continuous with the convex portion on a radially outer side of the convex portion and inclined so as to approach the bottom surface of the piston ring with convergence in the radially inward direction, and
the piston ring has an outer peripheral wall portion protruding toward a piston crown of the piston body in a central axis direction in an outer peripheral portion of the top surface of the piston ring.

20. The piston ring according to claim 19,
wherein a radius of curvature of the convex portion in a ring cross-section is at least 0.5 mm.

* * * * *